(12) United States Patent
Oh

(10) Patent No.: US 6,763,413 B2
(45) Date of Patent: Jul. 13, 2004

(54) METHOD FOR THE SERIAL TRANSFER OF DATA BETWEEN TWO ELECTRONIC BUS STATIONS AND BUS STATION FOR USE IN SAID METHOD

(75) Inventor: Jin Geun Oh, Shatin (HK)

(73) Assignee: Thomson Licensing S.A., Boulogne-Billancourt (FR)

( * ) Notice: Subject to any disclaimer, the term of this patent is extended or adjusted under 35 U.S.C. 154(b) by 448 days.

(21) Appl. No.: 09/790,121

(22) Filed: Feb. 21, 2001

(65) Prior Publication Data

US 2001/0023468 A1 Sep. 20, 2001

(30) Foreign Application Priority Data

Feb. 22, 2000 (EP) .............................................. 00250058

(51) Int. Cl.⁷ .............................. G06F 13/00; H04L 7/00
(52) U.S. Cl. ...................... 710/107; 710/305; 375/354
(58) Field of Search ................................. 710/100, 107, 710/305, 72; 713/400; 370/471, 462, 503; 375/359, 356, 260, 354

(56) References Cited

U.S. PATENT DOCUMENTS

| | | | | |
|---|---|---|---|---|
| 4,369,516 A | * | 1/1983 | Byrns | 375/359 |
| 4,654,655 A | * | 3/1987 | Kowalski | 340/825.5 |
| 4,750,115 A | | 6/1988 | Sekiya et al. | |
| 5,146,567 A | * | 9/1992 | Kao | 710/72 |
| 5,758,098 A | | 5/1998 | Townsley et al. | |
| 5,848,072 A | * | 12/1998 | Prill et al. | 370/471 |

FOREIGN PATENT DOCUMENTS

| | | |
|---|---|---|
| EP | 0589499 A1 | 3/1994 |
| EP | 0693729 A1 | 1/1996 |

* cited by examiner

*Primary Examiner*—Khanh Dang
(74) *Attorney, Agent, or Firm*—Joseph S. Tripoli; Robert D. Shedd; Paul P. Kiel

(57) ABSTRACT

A bus protocol for serial transfer of data between two electronic components via a 3 line bus connection. The bus protocol according to the invention transfers data words without handshake signals for each bit. Each data word is transferred synchronously from a transmitter to a receiver. One bus line is dedicated to a clock signal. The two other bus lines are used for transmitting the data signals and control signals. By assigning the two remaining bus lines differently to data signals and control signals for transfer in the two directions, bus conflicts can be easily solved.

7 Claims, 2 Drawing Sheets

METHOD FOR THE SERIAL TRANSFER OF DATA BETWEEN TWO ELECTRONIC BUS STATIONS AND BUS STATION FOR USE IN SAID METHOD

BACKGROUND OF THE INVENTION

The present invention relates to a method for the serial transfer of data between two electronic bus stations and to a bus station for use in said method.

Electronic consumer products often can be divided in two parts. These are front end and back end. Examples of consumer electronics products with this kind of structure are all kinds of disk players like CD player (Compact Disk), MD player (Mini Disk), DVD player (Digital Versatile Disk) and all its derivatives like video CD player, CD recorder etc. With the front end user commands are received via key entries or remote control device. The commands are forwarded to the back end part where they are executed in order to attain the associated control operation. The two part structure with front and back end has the advantage that both parts can be developed independent from each other. Of course there needs to be an interface between the two sections. This interface can then be used in various applications.

A known interface for data exchange between two electronic units is the "Video 6001 DSA Interface 7003" from Philips. It is a serial bus interface which serves for the serial transfer of data between two electronic components. As usual, in each electronic units there is an interface electronic which is connected on the internal side with the internal address, data and control bus and on the external side with the bus lines of the serial bus connection. Three bus lines are required for the serial data transfer according to the Philips DSA bus description. One line is dedicated to the data signals, a second line STB and third line SCK are reserved for control purposes. In particular these lines are used for handshake signals. If a transmitter wants to send some data, it first clears the data line to indicate that it wants to transmit data. Then it waits for a low level on the ACK line set by the receiver. After this the transmitter sets the data line high and waits for a high level on ACK line from receiver, which signals the end of starting synchronisation.

After this, the transmitter sends its data to the receiver over the DATA line. Data is send in units of 16 bit data words per each transmission phase. The transmitter sets the data line according to the bit to be send. When the DATA line becomes stable, the transmitter clears the STB line to tell the receiver that the information on DATA line is valid. The receiver reads the DATA line after the STB line low status is recognised. Then the receiver clears the ACK line to let the transmitter know that the bit was read. The transmitter sets the STB line high and waits for the ACK line high status. When the ACK line becomes high, one data bit is completely transferred.

SUMMARY OF THE INVENTION

As explained above, in the Philips DSA bus protocol each bit of a data transfer is declared to be valid and acknowledged with handshake signals on STB and ACK lines. This is a first reason which makes the bus transfer relatively slow. Furthermore, for each 16 bit data transfer a relatively long starting synchronisation process needs to be done. This is a second reason which makes the data transfer rate small.

After recognising these disadvantages it is an object of the invention to provide a modified bus protocol with which higher data transfer rates can be achieved without increasing the number of bus lines.

This object is achieved with the solution described below. The new bus protocol according to the invention is based on a combination of asynchronous and synchronous serial data transmission. The bits of a data word are transferred synchronously from transmitter to receiver. This means that there are no handshake signals which accompany the transmission of each bit. Instead, the transmitter/reveiver generates the data transfer clock which is transmitted on a dedicated bus line in parallel. Thus, the sampling points for the receiver are predefined by this clock signal as in the well known synchronous serial data transfer mode. Very high data transfer rates are achievable with this type of synchronous data transfer.

In the bus protocol it is specified that a data transfer from master to slave is signalled by sending an edge signal on a bus line which is being configured to be a data line for the master. Another bus line is being configured to be a control line for transmissions from master to slave. For data transfers from slave to master a different bus line is being configured as a data line for the slave and the other bus line is being configured to be a control line for transmissions from slave to master. There is one bus line dedicated to carry clock signals, only. This is valid for both transmission directions, from master to slave and vice versa, depending on the application. With this configurations of bus lines, bus conflicts in the case that the two bus stations are trying to access the bus simultaneously at the same time point can be easily solved in the ongoing transmission without the need of repetitive transmissions.

In such a case, due to the fact that the starting edge signals dedicated to both stations are transmitted over different bus lines, it is easy to achieve that the master will always win this conflict and the slave will change its state to receipt mode during the time period associated to the starting edge signal from master. The master will then synchronise itself to the edge signal on the control line activated by the slave so that synchronous data transmission can take place. Due to the fact that reconfiguration has been performed already during the time period of the start bit it is possible to specify a relatively short fixed delay time for synchronising, i.e. selecting the right phase of the clock signal generated in the transmitter/receiver. After this time period synchronous data transmission over the data line and clock line is commenced.

Advantageously, additional embodiments of the inventive method are disclosed in the respective dependent claims.

Data transfer in the direction from slave to master can easily be made in a similar manner as data transfer from slave to master, according to the present invention.

Transmitting a 16 bit data word in two pieces from master to slave or vice versa is advantageous if 8 bit microcontrollers are used in the bus stations. The internal data bus is often only 8 bit broad, so that a 16 bit data needs to be transfer to memory with tow different bus cycles. Another advantage is that a kind of byte handshake is makes sure that each byte is transferred correctly. For example, if an error occurs during the first transmission phase, data transfer can be interrupted immediately, which allows for a faster repetition of the data transfer.

For a bus station for use in a method according to the invention it is advantageous to connect the bus line dedicated to the data signals to an external interrupt input in addition to a data input in order to assure instantaneous reaction on a starting edge signal send by another bus station. This is in particular advantageous for a slave bus station. By doing so, bus conflicts can be immediately solved within an ongoing transmission without the need to stop transmission and wait for the repetition.

BRIEF DESCRIPTION OF THE DRAWINGS

Embodiments of the invention are described with reference to the accompanying drawings, which show in.

DESCRIPTION OF THE PREFFERED EMBODIMENTS

The bus protocol according to the invention will now be explained by way of two examples.

Figure 1:
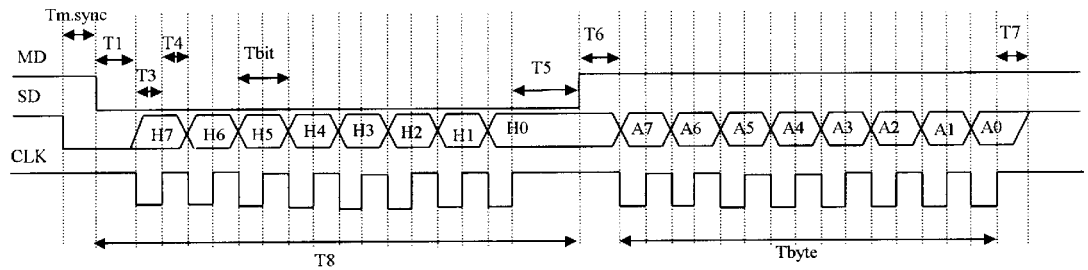
FIG. 1 a signal diagram for the transmission of data from slave to master.

First, a data transmission from slave unit to master unit will be described. FIG. 1 shows the signals on the three bus lines for a data transfer operation. Before data transfer, all three bus lines remain in an idle state which is the 'High' state in this example. Of course, in another example the idle state could be the 'Low' state on bus line and the active state respectively the 'High' state. A data transfer from slave to master is started by sending an edge signal from slave to master via bus line SD, where SD stands for 'slave data'. For sending the edge signal, bus line SD is set to active state. It follows a time period Tm.sync for synchronisation. The master unit will detect the edge signal on bus line SD and react accordingly. In particular it will switch over to a receipt mode in response to the detection of the start bit. This means that it will stay in receipt mode for the next data transfer period and will not access the bus even when getting a transmission request from the application microcontroller. After finishing preparation of receipt mode in master unit, the master unit will set the bus line MD, where MD stands for master data, from idle to active state. The thus generated edge signal signals to the slave that the master is ready for receiving data. There is a characteristic time period T1 after the edge signal on bus line MD, in which the master unit selects the right phase of the free running clock signal for data transfer, internally generated. This can be done with a controllable delay line which receives as an input the free running clock signal. The edge signal on bus line MD is used as a reference. An example of such a controllable delay line is disclosed in EP-A-0 303 494. For the purpose of the disclosure of this controllable delay line it is therefore particularly referred to this document. In this embodiment, the master generates the clock signal, not the slave, which is the transmitter. The clock signal is therefore provided by the receiver.

The clock signal occurs on data line CLK with the right phase after elapse of the time T1. With the start of the clock signal the first data bit H7 is set up on bus line SD. Each bit is evaluated in the master with the rising edge of the transferred clock signal. This operation is repeated for each of the eight bits H7 to H0 of the first transmission phase. After the transmission of bit H0 the first transmission phase is finished with a time out period T5. The bus line CLK is set to idle state in this period. This gives time for the master unit to transfer the data in 8 bit receipt shift register to memory.

The second transmission phase of the data transfer operation starts with a rising edge on bus line MD. Thus, for the second phase the master unit sets bus line MD to idle state. By doing this, it signals to the slave unit that it is ready to receive the second data byte. The clock signal and the first bit of the second transmission phase occurs on bus lines CLK and SD after elapse of a time period T6 from the rising edge on bus line MD. Time period T6 can also be a very short time period as time period T1. During this time period resynchronisation of the free running clock signal is performed with controllable delay line as described above.

The bits A7 to A0 are transferred synchronously over bus line SD with the clock signal. Evaluation of the bits is performed in each case at the rising edge of the clock signal. After evaluation of the last bit A0, data transfer is stopped and all data lines are brought into idle state. Time period T7 indicates the last hold time of bit A0.

Attention is drawn to the fact that FIG. 1 is not scaled correctly, therefore the durations of the time periods cannot be directly compared in FIG. 1. For this purpose a table with the exact values for the different time periods will be presented later in the description.

Figure 2:
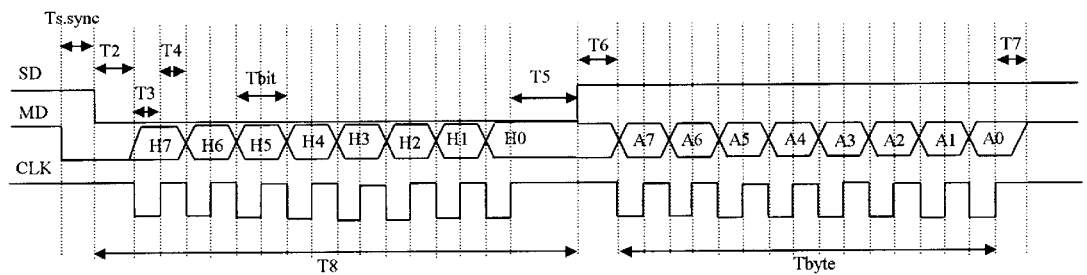
FIG. 2 a signal diagram for the transmission of data from master to slave.

Next, a data transmission from master unit to slave unit will be described. Reference is made to FIG. 2 for this purpose. For those parts which are identical with FIG. 1 the same reference signs have been used. One remarkable difference to FIG. 1 is that for the transmission of data bits from master to slave bus line MD is used and bus line SD is used for the purpose of transmission phase indication and synchronisation. Bus line CLK is again used for carrying the clock signal from master to slave.

Another difference is that the time period Ts.sync has a different length than time period Tm.sync. Time period Ts.sync is specified to be shorter than time period Tm.sync which is advantageous for solving bus conflicts when both units master and slave try to access the bus lines at the same time which will be explained later in the description.

The time period T2 in FIG. 2 is slightly different than the corresponding time period T1. But in another embodiment it could also be the same as time period T1. Therefore, this difference is not relevant for the purpose of the disclosure of this invention.

Data transfer from master to slave is also made in two phases with 8 data bits in each phase and resynchronisation after the first phase. Reference is made to FIG. 1 for this purpose.

Next, the case is described in more detail where both bus stations are arbitrating for the bus access. As there are only two bus stations, the conflict can relatively easily be solved. The master indicates its bus access intention by sending the edge signal on bus line MD. The slave indicates its bus access intention by sending the edge signal on bus line SD. The master is specified to be dominant and therefore he wins the arbitration phase. This is assured by specifying that the slave monitors the bus line MD when sending the start bit via bus line SD. In the case the slave detects the active state on bus line MD during the minimum synchronisation time period Tm.sync, Ts.sync (10 uSEC in the example given in the table below), it stops data transmission and reconfigures itself to the receipt mode immediately. This task is performed in the time period Ts.sync so that no interruption of master to slave data transmission is required. The bus conflict is therefore be resolved within the starting time period Ts.sync. The master need not to monitor bus line SD in this minimum time period because it is dominant over the slave unit and cannot be interrupted.

The specification that time period Tm.sync is longer than time period Ts.sync assures, that bus line MD will not be driven by the slave unit before the bus conflict is resolved. This avoids hardware failures due to overloading of the bus lines.

Figure 3:
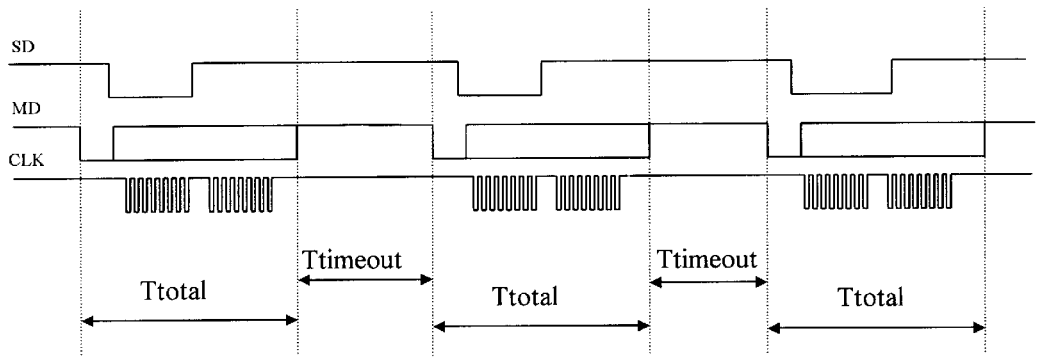
FIG. 3 a signal diagram showing a number of data transmissions from master to slave.

FIG. 3 shows a number of successive data transmissions from master to slave. It is shown that there is a time out between two transmissions. The corresponding time period has reference sign Ttimeout. This time out assures, that the receiver has written the latest received data into memory and the receipt shift register will be cleared for the next transmission period. A similar action needs to be taken in the transmitter. Here, the transmission shift register needs to be cleared either and the next 8 bit data word needs to be loaded in the transmission shift register. Of course, the reloading of the transmission shift register is only being done if a transmission request has already been received from the application microcontroller. In case the master doesn't want to transmit data, there is no reloading of the transmission shift register but the receipt shift register needs to be cleared for preparation of a possible data transfer from slave to master. Accordingly, the transmission shift register needs to be loaded in this time period, if a transmission request has been received in the slaves bus interface unit.

One possible modification for another embodiment is the provision of only one 8 bit shift register in each bus station. Here, it is required, that the output of the respective shift register is switched from one bus line to the other during reconfiguration from receipt mode to transmission mode or vice versa. A corresponding control logic needs to be implemented accordingly.

Figure 4:
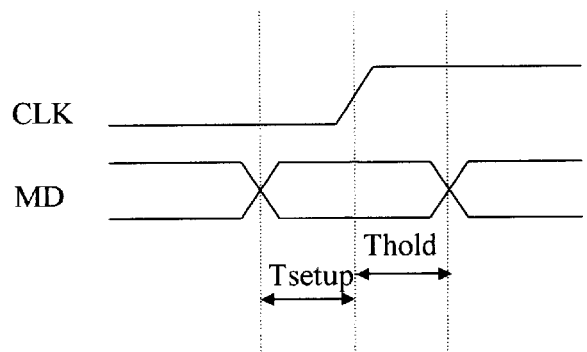
FIG. 4 a signal diagram for illustrating the set-up and hold time periods for a transmission of a data bit.

FIG. 4 shows the set up and hold time periods for a data bit transfer with respect to the clock signal.

In the table below, the typical values and the tolerances for the various time periods mentioned before and shown in the drawings are listed.

|  | Min ($\mu$S) | Typ ($\mu$S) | Max ($\mu$S) |
| --- | --- | --- | --- |
| Tm.sync | 10 | 300 | 4mS |
| Ts.sync | 10 | 50 | 200 |
| Tbit | 2 | 30 | 200 |
| Tbyte | 16 | 240 | 500 |
| T1 | 20 | 15 | 300 |
| T2 | 0 | 10 | 300 |
| T3 | 1 | 15 | 300 |
| T4 | 1 | 15 | 300 |
| T5 | 100 | 100 | 300 |
| T6 | 0 | 2 | 300 |
| T7 | 0 | 2 | 300 |
| T8 | 116 | 300 | 600 |
| Ttotal | 126 | 850 | 4600 |
| Ttimeout | 50 | — | — |
| Tsetup | 0.1 | 15 | 300 |
| Thold | 0.1 | 15 | 300 |

For the time period Ttimeout no entries for the typical and maximum values have been given, because this is highly dependent on the application and therefore, it is not reasonable to fill in some values.

Figure 5:
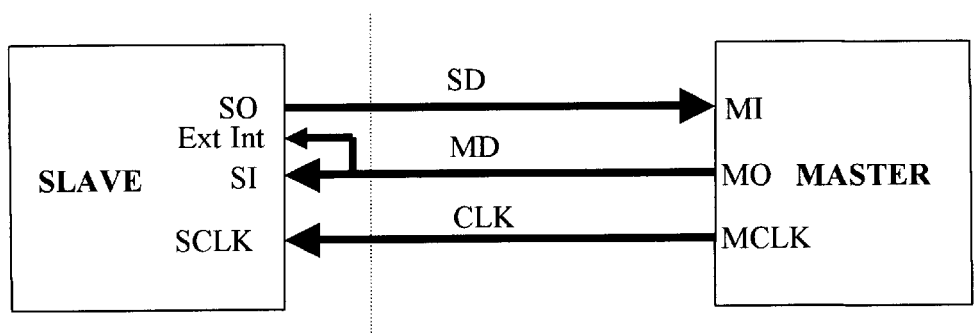
FIG. 5 a first example of how the bus lines can be connected to the inputs of master and slave units and FIG. 6 a second example of how the bus lines can be connected to the inputs of master and slave units.
Figure 6:
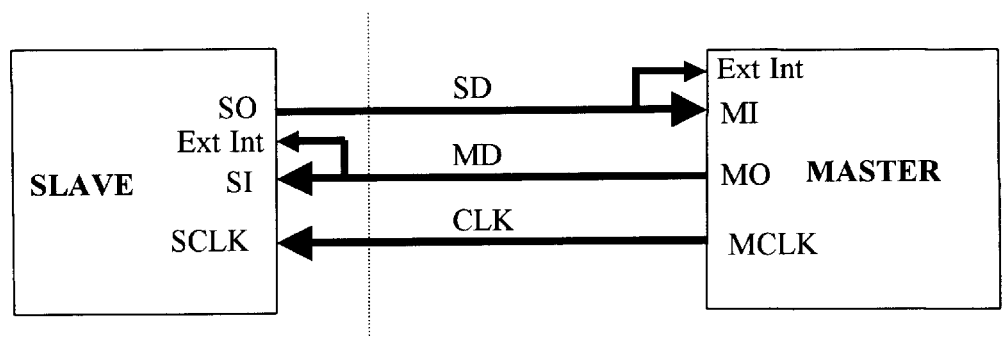

In FIG. 5 it is shown how the three bus lines can be connected to inputs/outputs of the master and slave units. In this example, bus line SD is connected to an SO pin of the slave unit and to an MI pin of the master unit. Bus line CLK is connected to an SCLK pin of slave unit and to an MCLK pin of the master unit. Bus line MD is connected to an SI pin of the slave unit and to an MO pin of the master unit. In addition, bus line MD is connected to an external interrupt input Ext Int of the slave unit. The connection of bus line MD with the external interrupt input in the slave is advantageous for the purpose of arbitration phase where an immediately response of the slave unit to a falling edge on bus line MD is required. Such immediately response is not necessarily required at the master unit, because it anyway wins the arbitration phase as explained above. The connection of external interrupt input of slave unit with bus line MD can be made internally in the slave unit as an alternative. In the preffered embodiment, as shown in FIG. 5., the bus lines are unidirectional but the direction of the bus line CLK can be changed depending on the preference of the development engineer. In the illustrated case, the clock signal CLK is provided for both directions exclusively from the master. But this depends on the application and could also be from slave to master In FIG. 6 a second embodiment is shown of how the three bus lines can be connected to inputs of the master and slave units. In this embodiment, bus line SD is in addition connected to an external interrupt input Ext Int of the master for fast response to an edge signal on line SD.

In an alternative embodiment, the bus lines could be bidirectional.

With the new bus protocol data transfer between two electronic components can be made in both directions via a three line bus with a very high speed. In the example presented above a 16 bit data transfer is performed in less than 1 ms. Of course, the values present in the table above may be subject of modification in corresponding implementations so that even faster data transfers may be possible.

What is claimed:

1. A method for serial transfer of data between two electronic bus stations, one being a master station and the other being a slave station, over a 3 line bus connection where a 1st line is dedicated to a clock signal, and a second line and a third line are dedicated to data signals or control signals, comprising the steps of:
   i) starting a data transfer from the master station to the slave station by sending a 1st edge signal from the master station to the slave station on said 2nd line;
   ii) in response to the 1st edge signal, the slave station switching the third line from an idle-state to an active state, after a 1st amount of time has elapsed from the occurrence of said 1st edge signal; and
   iii) commencing synchronous data transmission via said second and first lines after a 2nd amount of time has elapsed from the occurrence of the active state on the third line during which the third line stays in its active state, wherein the master station provides the clock signal to the slave station via the 1st line and the master station provides the data signals to the slave station via the second line.

2. Method according to claim 1, further comprising the step of providing data transfer from the slave station to the master station with the following steps:
   i) sending a 2nd edge signal from the slave station to the master station on said 3rd line;
   ii) in response to the 2nd edge signal, switching the second line from an idle-state to an active state, after a 3rd amount of time has elapsed from the occurrence of said 2nd edge signal; and iii) commencing synchronous data transmission via said third and first line after a 4th amount of time has elapsed from the occurrence of the active state on the second line, during which the second line stays in the active state, wherein the master station provides the clock signal to the slave station via the 1st line.

3. Method according to claim 1, wherein during said synchronous data transmission a data word of predefined length is transferred.

4. Method according to claim 3, wherein the synchronous data transmission is divided in two transmission phases with an interruption in-between the two transmission phases, and wherein in each transmission phase a part of said data word is transferred.

5. Method according to claim 4, wherein after the end of the first transmission phase, the third or second line is switched back to idle state after a 5th amount of time and wherein the second transmission phase is thereafter started after elapse of a 6th amount of time.

6. Method according to claim 1, wherein for the certain amount of time periods the following typical values and tolerance values are valid:

|  | Min ($\mu$S) | Typ ($\mu$S) | Max ($\mu$S) |
|---|---|---|---|
| Tm.sync | 10 | 300 | 4mS |
| Ts.sync | 10 | 50 | 200 |
| Tbit | 2 | 30 | 200 |
| Tbyte | 16 | 240 | 500 |
| T1 | 20 | 15 | 300 |
| T2 | 0 | 10 | 300 |
| T3 | 1 | 15 | 300 |
| T4 | 1 | 15 | 300 |
| T5 | 100 | 100 | 300 |
| T6 | 0 | 2 | 300 |
| T7 | 0 | 2 | 300 |
| T8 | 116 | 300 | 600 |
| Ttotal | 126 | 850 | 4600 |
| Ttimeout | 50 | — | — |
| Tsetup | 0.1 | 15 | 300 |
| Thold | 0.1 | 15 | 300. |

7. Method according to claim 1, wherein the method is performed in an apparatus, which is a consumer electronics device, in particular disk player, tuner, cassette player, receiver, or an amplifier.

* * * * *